United States Patent
Weber et al.

(10) Patent No.: US 8,200,777 B2
(45) Date of Patent: Jun. 12, 2012

(54) METHOD FOR TRANSMITTING DATA IN A NETWORK OF DISTRIBUTED STATIONS, AND NETWORK STATION

(75) Inventors: Michael Weber, Hannover (DE); Ingo Huetter, Pattensen (DE)

(73) Assignee: Thomson Licensing, Issy les Moulineaux (FR)

( * ) Notice: Subject to any disclaimer, the term of this patent is extended or adjusted under 35 U.S.C. 154(b) by 258 days.

(21) Appl. No.: 11/886,108

(22) PCT Filed: Feb. 21, 2006

(86) PCT No.: PCT/EP2006/060138
§ 371 (c)(1),
(2), (4) Date: Sep. 10, 2007

(87) PCT Pub. No.: WO2006/094899
PCT Pub. Date: Sep. 14, 2006

(65) Prior Publication Data
US 2008/0263173 A1    Oct. 23, 2008

(30) Foreign Application Priority Data
Mar. 11, 2005    (DE) .......................... 10 2005 011 333

(51) Int. Cl.
*G06F 15/16* (2006.01)
*G06F 15/173* (2006.01)
(52) U.S. Cl. .................... 709/217; 709/223; 709/201
(58) Field of Classification Search .......... 709/201–203, 709/217–229
See application file for complete search history.

(56) References Cited

U.S. PATENT DOCUMENTS

| 6,725,281 | B1 | 4/2004 | Zintel et al. |
| 6,779,004 | B1 * | 8/2004 | Zintel ........................... 709/227 |
| 7,171,475 | B2 * | 1/2007 | Weisman et al. ............. 709/227 |
| 2002/0083143 | A1 | 6/2002 | Cheng |
| 2003/0101294 | A1 | 5/2003 | Saint-Hilaire et al. |
| 2003/0117433 | A1 * | 6/2003 | Milton et al. ................. 345/738 |

(Continued)

FOREIGN PATENT DOCUMENTS
WO    0201833 A1    1/2002
(Continued)

OTHER PUBLICATIONS

J. Ritchie et al.: "UPnP AV Architecture: 0.83", Design Document Microsoft, Jun. 12, 2002, pp. 1-22, cited in the application chapter 5. Search Report Dated Mar. 28, 2006.

*Primary Examiner* — Yasin Barqadle
(74) *Attorney, Agent, or Firm* — Robert D. Shedd; Jeffrey M. Navon

(57) ABSTRACT

The invention relates to the technical field of home networks. A home network based on the present UPnP standard (Universal Plug and Play) allows data to be interchanged between network subscriber stations. A UPnP standard may have one or more control point devices. To allow profile information such as user profile or network profile to be interchanged, the invention proposes providing a control point device firstly with an expanded device ascertainment service which can be used to find the other control point devices in the network and also with one or more additionally implemented profile services which allow the other control point devices in the network to be notified about change to profile information on a control point device.

19 Claims, 5 Drawing Sheets

U.S. PATENT DOCUMENTS

| | | |
|---|---|---|
| 2004/0100492 A1 | 5/2004 | Mercs |
| 2004/0205172 A1 | 10/2004 | Kim |
| 2005/0055352 A1 | 3/2005 | White et al. |
| 2006/0168320 A1* | 7/2006 | Kidd et al. .................. 709/238 |
| 2006/0184693 A1* | 8/2006 | Rao et al. ..................... 709/245 |

FOREIGN PATENT DOCUMENTS

WO 2005002139 A1 1/2005

* cited by examiner

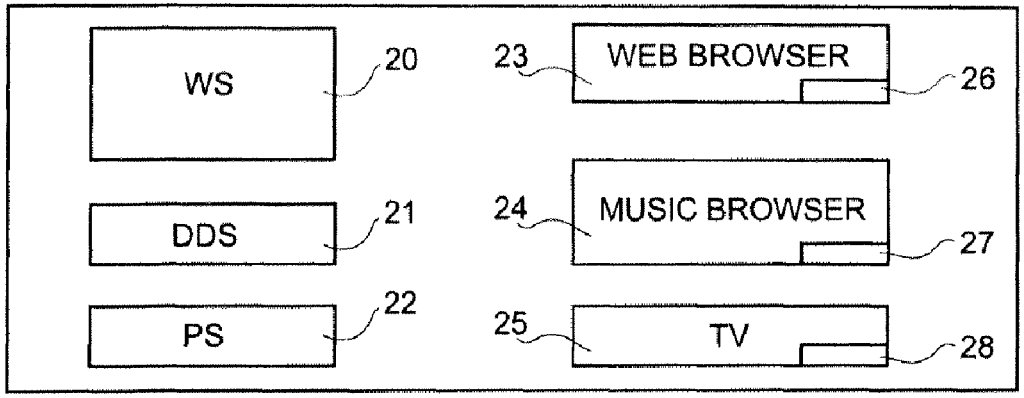

Fig.3

Service: SyncProfiles

```
<?xml version= "1.0"?>
-<scpd xmlns="urn:schemas-upnp-org:service-1-0">
   -<specVersion>
      <major>1</major>
      <minor>0</minor>
   </specVersion>
   -<actionList>
      ...
   <actionList>
   -<serviceStateTable>
      -<stateVariable sendEvents="yes">
         <name>Bookmarks</name>
         <dataType>String</dataType>
      </stateVariable>
      -<stateVariable sendEvents="yes">
         <name>FavouriteMusicStyle</name>
         <dataType>String</dataType>
      </stateVariable>
      -<stateVariable sendEvents="yes">
         <name>FavouriteTVChannels</name>
         <dataType>String</dataType>
      </stateVariable>
   </serviceStateTable>
</scpd>
```

Fig.5

CP Device Desription

```xml
<?xml version= "1.0"?>
<root xmlns="urn:schemas-upnp-org:service-1-0">
    <specVersion>
        <major>1</major>
        <minor>0</minor>
    </specVersion>
    <device>
        <deviceType>urn:domainxy:device:ControlPoint:v</deviceType>
        <friendlyName>short user-friendly title</friendlyName>
        <manufacturer>manufacturer name</manufacturer>
        <manufacturerURL>URL to manufacturer site</manufacturer URL>
        <model Desciption>long user-friendly title</modelDescription>
        <modelName>model name</modelName>
        <modelNumber>model number</modelNumber>
        <modelURL>URL to model site</modelURL>
        <serialNumber>manufacturer's serial number</serialNumber>
        <UDN>uuid:UUID</UDN>
        <UPC>Universal Product Code</UPC>
        <iconList>
            ...
        </iconList>
        <serviceList>
            <service>
                <serviceType>urn:domainxy:service:
                    SyncWebBrowser:v</serviceType>
                <serviceID>urn:domainxy:serviceID:serviceID</serviceID>
                <SCPDURL>URL to service desription</SCPDURL>
                <controlURL>URL for control</controlURL>
                <eventSubURL>URL for eventing</eventSubURL>
            </service>
            ...
        </serviceList>
        <deviceList>
            ...
        </deviceList>
        <presentationURL>URL for presentation</presentationURL>
    </device>
</root>
```

Fig.4

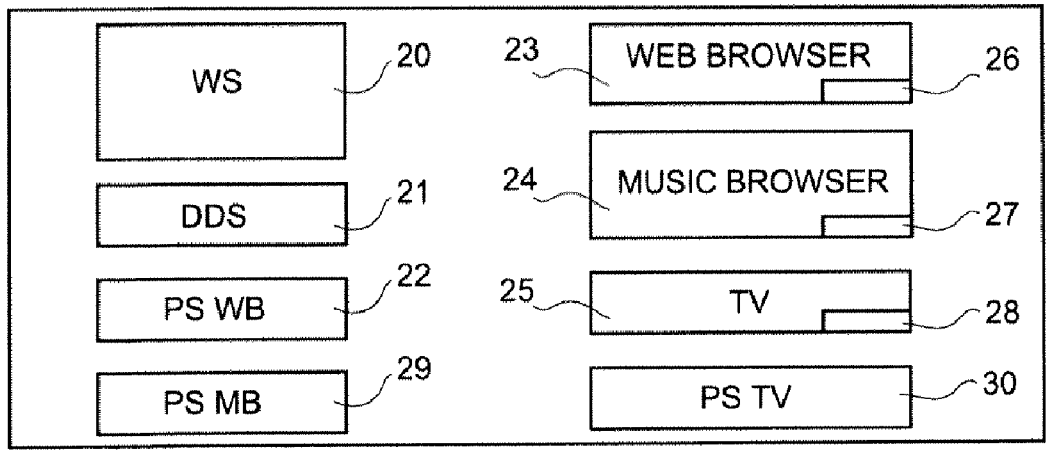

Fig.6

```
= <bookmarks>
  = <sync>
        <timestamp>561651321</timestampstamp>
        <timestampsync>yes</timestampsync>
        <foresync>no</forcesync>
    </sync>
  = <bookmarklist>
    = <bookmark>
        <name>Domain</name>
        <description>Domaindescription</description>
        <url>http://www.domain.com</url>
      </bookmark>
    = <bookmark>
        <name>Domain 2</name>
        <description>Domaindescription 2</description>
        <url>http://www.domain2.com</url>
      </bookmark>
      ...
    </bookmarklist>
  </bookmarks>
```

Fig.8

Service: SyncWebBrowser

```xml
<?xml version="1.0"?>
-<scpd xmlns="urn:schemas-upnp-org:service-1-0">
    -<specVersion>
        <major>1</major>
        <minor>0</minor>
    </specVersion>
    -<actionList>
        ...
    </actionList>
    - <serviceStateTable>
        -<stateVariable sendEvents="yes">
            <name>Bookmarks</name>
            <dataType>String<dataType>
        </stateVariable>
        - </stateVariable sendEvents="yes">
            <name>BrowserConfiguration</name>
            <dataType>String</dataType>
        </stateVariable>
    </serviceStateTable>
</scpd>
```

Service: SyncMusicBrowser

```xml
<?xml version="1.0"?>
-<scpd xmlns="urn:schemas-upnp-org:service-1-0">
    -<specVersion>
        <major>1</major>
        <minor>0</minor>
    </specVersion>
    -<actionList>
        ...
    </actionList>
    -<serviceStateTable>
        -<stateVariable sendEvents="yes">
            <name>FavouriteMusicStyle</name>
            <dataType>String<dataType>
        </stateVariable>
    </serviceStateTable>
</scpd>
```

Fig.7

METHOD FOR TRANSMITTING DATA IN A NETWORK OF DISTRIBUTED STATIONS, AND NETWORK STATION

This application claims the benefit, under 35 U.S.C. §365 of International Application PCT/EP2006/060138, filed Feb. 21, 2006, which was published in accordance with PCT Article 21(2) on Sep. 14, 2006 in English and which claims the benefit of German patent application No. 102005011333.8, filed Mar. 11, 2005.

The invention relates to the technical field of home networks.

BACKGROUND OF THE INVENTION

A wealth of different standards have been elaborated, in part with different aims, for networking devices in the household. One of the systems provides for the devices to be networked on the basis of the "Internet protocol" IP. The system has become known by the abbreviation UPnP, which stands for Universal Plug and Play. A UPnP standard is currently available in version 1.1. More detailed information regarding the UPnP system and the associated standard can be found on the official Internet page of the UPnP consortium.

The UPnP system has no restrictions regarding the device types. This is intended to allow both devices from the consumer electronics field, such as TV, DVD player, set-top box, video recorder, camcorder etc., and also other devices in the household, for example washing machine, chillers, heating control, coffee machines, lighting and shutter control, alarm systems and others, to be networked. Personal computers may likewise be regarded as belonging to the category of consumer electronics devices. These are also covered by the UPnP system and can also be integrated into the network.

However, the UPnP system does not contain a specification for the lower layers of the OSI/ISO reference model for data communication. This concerns particularly the physical layer and the data link layer. The UPnP system therefore no longer contains a specification regarding what transmission medium needs to be used to transmit the data which are to be interchanged. Different transmission standards are permissible in this case. Examples of suitable transmission standards are the Ethernet protocol, the IEEE-1394 protocol, and even wireless transmission based on IEEE 802.11x, Bluetooth or Hiperlan/2 are likewise suitable.

The UPnP specification describes how devices based on the UPnP standard are designed and how they can be controlled. One of the basic ideas of this specification is that it is possible to operate any UPnP device using a standard HTML browser. To this end, every UPnP device has a web server on which it is possible to store the HTML pages for operating the device (the "presentation pages").

In the UPnP standard, the localization of UPnP devices in the network is the responsibility of "control point devices". However, this involves the respective UPnP devices themselves registering with the control point devices. Equally, control point devices can look for UPnP devices in the network.

When a control point device has found a UPnP device, it fetches the device's description from the URL (Uniform Resource Locator) indicated during registration using the HTTP and TCP-IP protocols. The UPnP device provides the description in the form of an XML document. Using the information which the control point has obtained from the device's description document, this device can now send "SOAP messages" (Simple Object Access Protocol) to the device's control URL in order to control said device.

INVENTION

Often, a UPnP network will contain not just one control point device but rather a plurality thereof. The user interface for controlling a device frequently provides an opportunity to create a network profile or user profile. Such profile information may relate to the preferred musical orientation in the case of an audio device, for example, or to the preferred categories of TV programmes or the favourite TV channels in the case of a TV set. Other examples of such profile information are a list of frequently used Internet pages or particular setting states for devices in the household for different times, such as a day, night or holiday program.

It is an aim of the invention to allow profile information to be interchanged between the various control point devices in the network. To this end, the control point devices first need to be provided with the capability of localizing other control point devices in the network. Although the UPnP standard provides the control point devices with a device identification service, they cannot use this service to find any other control point devices in the network. This is because the UPnP standard has no provision for this. The invention therefore first of all proposes providing an expanded device identification service on the control point devices in the network. There is also provision for a control point device to contain an additionally implemented profile service which the control point devices use to provide profile information. This also allows profile information to be interchanged.

The measures presented in the dependent claims permit advantageous developments and improvements. Advantageously, the control point devices can be notified about changed profile information using the event messages provided in the UPnP standard (Event Notification). To this end, the control point devices register with the other control point devices in the network for notification in the event of the profile information being altered. If the profile information is stored as a variable, the event message is used to notify the other control point devices about any alteration to this variable.

The profile information may advantageously relate to a user profile. Equally, the profile information may also relate to a network profile. The user profiles or network profiles may differ according to time of day, day of the week, month or season, or a special time such as a holiday or business trip. When a control point device has been notified of changed profile information, this control point device can transfer the new profile information to its own profile. In this regard, it is advantageous if the profile information is linked to currency-level information, in order to be able to check how current the profile information which has been communicated is. The profile information communicated would advantageously be transferred only if it is found to be more current than the information which is still stored in the control point device's own profile.

Conversely, the profile information may be linked to transfer control information, possibly in addition to the currency-level information. This condition information is intended to indicate in the change notification that the new information is to be transferred from the other control point devices in the network, possibly regardless of the currency-level information. The transfer control information is then advantageously information which the user himself has input, which means that he retains full control over the profiles which are to be changed.

Corresponding advantageous measures for a network station as control point device in the network are presented in Claims 11 to 19.

DRAWINGS

Exemplary embodiments of the invention are shown in the drawings and are explained in more detail in the description below. In the drawings:

FIG. 3 shows a first example of a control point device based on the invention;

FIG. 4 shows a first example of a profile service;

FIG. 5 shows an example of a status variable for the profile service shown in FIG. 4;

FIG. 6 shows a second example of a control point device based on the invention;

FIG. 7 shows further examples of profile services based on the invention; and FIG. 8 shows an example of an XML device description for a control point device based on the invention.

EXEMPLARY EMBODIMENTS OF THE INVENTION

As part of the UPnP standardization, a specification for transmitting AV data (audio/video data) between network subscriber stations has also been drawn up, and concluded in June 2002. The exact title of this specification is: UPnP-AV architecture: 0.83 dated 12 Jun. 2002. This specification defines three different types of devices for transmitting AV data. First, a "MediaServer"; this denotes that device which is selected as the source of the AV data. Secondly, there is the device type MediaRenderer, which is a device which is used as a data sink for the AV data. Thirdly, as a separate device type, the Control Point type is also provided, which is called a control point device below. As an example, a universal remote control for the AV devices is regularly considered to be a control point device. Alternatively, however, a personal computer in the network can also perform this task or else a TV set with a remote control may likewise be suitable as a control device.

The control point device communicates with two other UPnP devices which are suitable as a data source and a data sink for a desired AV connection. The control point device initializes and configures both devices for the AV connection, so that the desired data stream can also be set up. Hence, the task of a control point device is typically to set up an AV connection between two network subscribers, possibly to make changes to the settings of the two devices, and, when the desired AV data stream has been transmitted, to cut the connection again, i.e. to ask both devices on the AV connection to delete the data which characterize the connection. However, control point devices in the UPnP standard are not specified to the extent that a complete API (Application Interface Program) is known for this device type.

Figure 1:
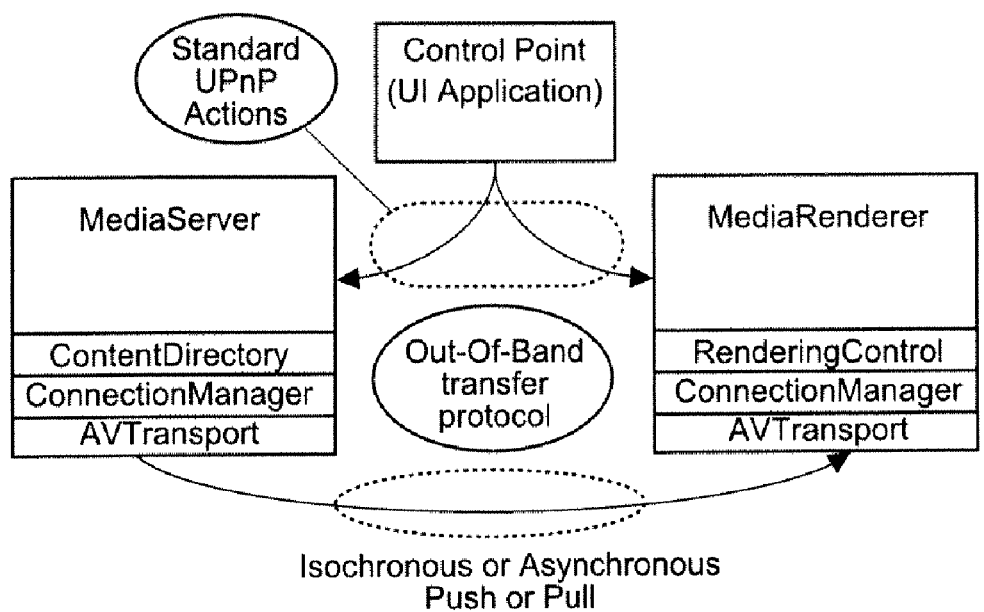
FIG. 1 shows a basic diagram of the transmission of AV data between two network stations in line with version 0.83 of the UPnP-AV architecture.

FIG. 1 shows the basic classification of network stations which are needed for an AV connection. The MediaServer device contains or has access to an AV data stream which, by way of example, is stored locally or is received externally. The MediaServer device has access to the AV data and is able to transmit an associated AV data stream to another network station via the network. In this case, the AV data stream is transmitted using a transfer protocol in line with the transmission medium which is provided in the network. The data transmission formats supported by the MediaServer are defined explicitly for every possible resource in the content directory service. Typically, the MediaServer device type can be assigned to one of the following devices: digital video recorder, CD/DVD player, camera, camcorder, PC, set-top box, satellite receiver, cassette recorder etc. To select a particular AV content, a module for a content directory is usually implemented in the MediaServer in accordance with the UPnP standard. Besides this, there is also a module which is called a Connection Manager and which the control point device uses to communicate with a MediaRenderer when a connection is set up.

A MediaRenderer device receives the AV data stream sent by the MediaServer and outputs it either as image information or as audible information. Similarly, the MediaRenderer device likewise contains an implementation of the Connection Manager module for communication with the control point device when a connection is set up. In addition, a Rendering Control module is implemented in the MediaRenderer device. This module receives commands for setting reproduction characteristics, such as volume, tone, definition, contrast, brightness, colour etc., and implements them.

Cited examples of devices which should be assigned the device type MediaRenderer in the home network are a TV set, a stereo amplifier and an MP3 player. Depending on the transmission format implemented, the MediaServer or the MediaRenderer also has an AV transport service which is used to control the data transfer and the reproduction (e.g. play, stop, fast forward etc.).

A control point device coordinates the data transport between MediaServer and MediaRenderer. It is likewise used to implement the operating commands from the operator and to forward them to the appropriate devices on the AV connection. In this case, the commands play, stop, pause, fast forward, rewind are particularly suitable examples. As mentioned at the outset, control point devices are also designed to find and control standard UPnP devices.

As FIG. 1 shows, the transmission of the AV data in line with the implemented AV transport protocol is independent of the communication with the control point device. The data stream is therefore transmitted even when the control point device has logged off from the network after the AV connection has been set up. Since the known transport protocols are standardized, no further information is provided in this regard below.

Figure 2:
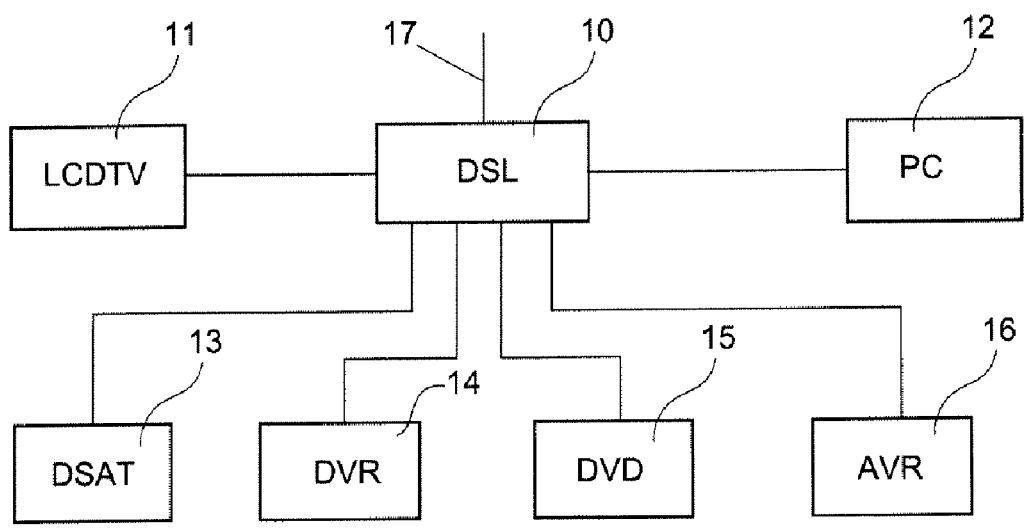
FIG. 2 shows an example network with UPnP-AV devices.

FIG. 2 shows a simple home network. All the devices in this network which are designed on the basis of the UPnP-AV specification are shown. The reference numeral 10 denotes a DSL modem. This is used simultaneously as the DSL router and as a network switch. The DSL modem 10 has the individual network stations connected to it in star form. The network connection technology used is Ethernet network technology. The reference numeral 17 denotes the telephone line to which the DSL modem is connected and which can be used to access the Internet. The DSL modem 10 may be configured as a UPnP Internet gateway device within the context of the UPnP specification. The reference numeral 11 denotes a flat screen device, such as an LCD television set or a plasma television set. This device has two UPnP device types. First, the flat screen device 11 can be regarded as a MediaRenderer device and is likewise configured as such too. In this case, it is used to show video contents, and possibly audio contents if the device is equipped with its own loudspeakers. Secondly, the device is also used as a control point device for controlling the other network stations.

The reference numeral 12 denotes a personal computer. This also has the functionality of a control point device. This is the typical task of the computer in the network. Secondly, the personal computer can also adopt the functionality of a MediaServer and also that of a MediaRenderer.

The reference numeral 13 denotes a digital satellite receiver. This device is of the MediaServer type. The reference numeral 14 denotes a digital video recorder. This device is also configured as a MediaServer device. This is equally true of the DVD player 15 which is also present in the network.

In addition, an AV receiver 16 is also shown. This device is used firstly for radio reception, and secondly also for amplifying audio signals and for outputting the audio signals on connected loudspeakers. This device thus internalizes both functionalities, MediaServer and MediaRenderer.

In the example shown in FIG. 2, not all of the devices shown need to be set up in one room. They may also be distributed over a plurality of rooms. By way of example, in practice it can be assumed that the flat screen device 11 and the personal computer 12 are accommodated in different rooms. It is thus possible to access the network from different rooms. The output of audio contents is not limited to the room in which the AV receiver 16 is positioned. First, the connected loudspeakers may be accommodated in different rooms, and secondly it is also possible to output audio contents in the room in which the personal computer 12 is set up, for example.

In addition, it is assumed in the exemplary case shown in FIG. 2 that both the personal computer 12 and the flat screen device 11 are equipped with an Internet browser. For a flat screen device, there is often a "digital signal processing box" in which the relevant module for the Internet browser may be arranged. The flat screen device 11 is operated using a typical remote control or conveniently using a radio keypad, for example. In the case of an Internet browser, it is normally possible to store frequently visited Internet pages as a favourites list or as a bookmark. If an entry is now added to the favourites list on one Internet browser, it may be desirable to transfer it automatically to the Internet browser of the other device in the network too.

It is similarly possible to access audio or video contents, stored either in the digital video recorder 14 or in the personal computer 12, both using the flat screen device 11 and using the personal computer 12. This also allows the user to create favourites lists or to store profile information, as in the case of particularly desired musical orientations or genre orientations in the case of video contents. Examples of categories of audio documents are classical, jazz, rock, pop, rock and roll, folk, country, techno etc. Examples of categories of video documents are action, comedy, adventure, science fiction, western, fantasy, thriller etc. The situation is similar for television too. Nowadays, the user can often store his viewing habits likewise in a profile, which means that he can create favourites lists, for example, with particular TV channels or can have recommendation lists created for particular categories of television programmes, such as news, reports, feature films, sport, culture etc.

An example of the way in which a recommendation list for playback of audio contents can be constructed is found in the earlier patent application EP 04 291 150.3.

The text below gives a more detailed explanation of how it can be made possible for this profile information which is present in the network to be interchanged between the control point devices 11 and 12 in the example network in FIG. 2. To this end, FIG. 3 shows the necessary components in the control point device. The design shown is valid for both control point devices 11 and 12 in the network. The reference numeral 20 denotes a web server. On this, the device provides a description of the device in the form of an XML document. This description contains information about the manufacturer, the serial number, the URLs for control, events and the presentation. For each service which the device provides, commands and actions and also file types and a data range or variable types and a value range are specified. An example of such an XML device description is shown in FIG. 4. The device type indicated in row 8 is highlighted, said device type being set as ControlPoint and thus indicating that it is a control point device. In the list of available services which is presented further below, the service for synchronizing the web browser is shown as an example. The other services for synchronizing the music browser and the favourites list of TV channels are merely indicated, but are also contained in the list.

The reference numeral 21 denotes a device identification service. According to the UPnP standard, this component is absolutely essential for a control point device. This service allows control points to look for UPnP devices in the network. This is the responsibility of the SSDP protocol (Simple Service Discovery Protocol). However, the UPnP standard contains no provision for the control point devices in the network also to register automatically with the other control point devices in the network when connecting to the network. Even in the event of a search request from the control point device to all the network stations which is provided in the SSDP protocol and is sent using a "multicast address" and port number 239.255.255.250:1900, the control point devices which are present in the network would not subsequently register.

In line with the invention, the device identification service 21 is expanded. In this case, a special device type and service type are stipulated for a control point device, which means that the control point devices likewise send an ssdp:alive message when connecting to the network, with its associated entry for the notification target NT. There is likewise support for a control point device to be able to search specifically for control point devices in the network. The appropriate search target is thus entered under the entry ST in the search request M-Search. The control point devices being sought would then register using the appropriate response message within the context of the discovery protocol. For further details in this regard, reference is made to the UPnP specification. This expanded device identification service 21 provides the individual control point devices with knowledge of one another and allows them to communicate with one another.

The reference numeral 22 denotes a profile service from the control point device. This supports the interchange of profile information. For every defined profile in the control point device, the profile service 22 contains at least one variable. Thus, by way of example, the preferred musical orientation can be characterized by a variable, which is then linked to a set of entries, for example jazz, pop, folk. For a favourites list for TV channels, a variable may likewise be made available which is then likewise again linked to a set of TV channel descriptors, for example ARD, ZDF, N3, RTL, SAT1, PRO7, WDR, Kabell, Eurosport, DSF. A similar situation applies to the profile for the frequently called Internet pages. In this case too, a separate variable may be provided. The profile service is described in the associated XML document of the control point device, as mentioned previously. There is thus the possibility for the other control point devices in the network to register for the alteration in the variables of the profile service 22. This is done as prescribed in the UPnP standard, using the XML-based General Event Notification Architecture (GENA). In the UPnP standard, the procedure which can be used to register for state changes in a variable is called Eventing:Subscription.

Every time an alteration occurs in one of the registered variables, the control point device on which the alteration has occurred sends a message to inform the other control point devices which have registered about the altered state. This is done using an event message, which is called an Eventing: Event Messages:Notify message in the UPnP standard. In the case of the invention, only an alteration which has been brought about by the user is communicated, that is to say when the alteration has been made by the application program which sets up the user interface.

As application programs, FIG. 3 also shows the application programs for an Internet browser 23, a music browser 24 and a user interface for a television set 25. Within these applications, there are also separately highlighted areas in which the profile information, that is to say favourites list for Internet pages 26, preferred musical orientations 27 and preferred TV channels 28, are stored.

An example of a profile service is shown in FIG. 5. This is an XML description for this service. There, the status variables listed are the variables Bookmarks, FavouriteMusicStyle and FavouriteTVChannels. These serve to synchronize the profile information for the three applications 23 to 25. The respective beginning also contains a definition that the status variable is incorporated in the eventing method of UPnP, that is to say the communication of the changed variables to all the subscribers.

A second example of a control point device based on the invention is shown in FIG. 6. In contrast to the example shown in FIG. 3, separate profile services 22, 29, 30 for each of the three applications are formed in this case.

The XML descriptions for the two separate services SyncWebBrowser and SyncMusicBrowser are shown in FIG. 7.

An example of an XML description of a status variable based on the invention is shown in FIG. 8. This figure shows the status variable called Bookmarks for the SyncWebBrowser service. Provision is made for the beginning to have time information providing information about the respective currency-level status of the variable. This should preferably show the time and the date from a real-time clock. The two sync options TimeStampSync and ForceSync can be used to stipulate whether or not the communicated, altered variable is to be transferred only using the time information.
TimeStampSync=No
ForceSync=No
means that transfer of the communicated change is not permitted.
TimeStampSync=Yes
ForceSync=No
means that transfer of the communicated change is permitted if the time information is found to be more current.
TimeStampSync=No
ForceSync=Yes
means that transfer of the communicated change is absolutely necessary without considering the time information.
TimeStampSync=Yes
ForceSync=Yes
is not defined and is available for future expansions.

In addition: this allows the control point devices, which themselves have also stored appropriate profile information, to compare whether their current profile information is outdated in comparison with the newly communicated profile information. If so, the latter is transferred to their own profile. If not, the communicated information can also be blocked out.

If a control point device contains no real-time clock of its own, it may be appropriate to omit the currency-level information.

As a further possibility, it would be desirable to allow the user to stipulate whether or not an alteration in the profile should actually be transferred to the other profiles. This transfer control information of the type Syncoption 1 and 2 would then also be transmitted to the control point devices when anything has changed in the profile and the control point devices which have received the new profile are then designed such that they evaluate the transfer control information and transfer the new information only if the transfer control signal has been set. This means that the user retains full control over his created profiles.

In the lower part of the XML description of the status variable Bookmarks in FIG. 8, the various entries for the marked Internet pages are listed.

The invention is not limited to the exemplary embodiments mentioned. It can also be used for "network profiles". These are profiles which are used to produce a particular state in the network or to monitor states in the network. By way of example, profiles for various times of day, day, night, for various days of the week, for various months, for various seasons or for various special times such as a holiday or business trip are suitable. In this case, it is then possible to enter different states for particular control devices in the network. Examples of these are a shutter control, heating control, alarm system setting, warning control, video recorder setting etc.

The invention claimed is:

1. Method for transmitting data in a home network of distributed stations, in which said distributed stations the functionalities of a device to be controlled are provided on a web server in the form of one or more information pages generated using a description language and are selected by a control point device in order to control a device at the home network which is to be controlled by means of a browser, wherein an expanded device ascertainment service in the control point device is used to find other control point devices in the home network in order to transmit user profile information between two or more control point devices in the network, with one or more additionally implemented user profile services in the control point device being used to send a notification about changed user profile information to the other control point devices in the home network, wherein a list of device types is extended with a device type control point device, and the expanded device ascertainment service is making use of a discovery protocol in which the two or more control point devices are searchable based on an assigned device type or service type, wherein for searching a control point device the expanded device ascertainment service in a requesting control point device is entering a device type control point as a search target in a search request and the expanded device ascertainment service in the search target control point device is answering to this search request in a response message.

2. Method according to claim 1, wherein the user profile service sends the notification about changed user profile information to all those control point devices which have been registered for notification about changed profile information.

3. Method according to claim 1, where the user profile information comprises a user profile about a preferably desired musical orientation, a preferably desired TV or radio channels or programmes, or a list of selected Internet pages.

4. Method according to claim 3, wherein the user profile differs according to time of day, day of the week, month or season, or a special time such as a holiday or business trip.

5. Method according to claim 2, wherein the control point device which has been notified about changed user profile information transfers the changed user profile information to its own user profile.

6. Method according to claim 1, wherein the user profile information is linked to currency-level information.

7. Method according to claim 6, wherein the changed user profile information is transferred to the control point device's own user profile only if the currency-level information shows it to be more current than the information in the control point device's own user profile.

8. Method according to claim 6, wherein the user profile information is linked to transfer control information, which indicates whether the changed user profile information is to be transferred from the other control point devices in the home network regardless of any currency-level information which is present.

9. Method according to claim 1, wherein the home network of distributed stations is a network based on the UPnP standard, corresponding to Universal Plug and Play.

10. Home network station as control point device for acting as a requesting control point device in the method according to claim 1, with one or more user profile information items, wherein, the home network station has an expanded device ascertainment service which can be used to find the other control point devices in the home network, and in that one or more additionally implemented user profile services are provided which are used to notify the other control point devices in the home network about changed user profile information, wherein a device type control point is assigned to the control point device and the expanded device ascertainment service is adapted to make use of a discovery protocol in which control point devices are searchable based on the assigned device type control point, wherein for searching a control point device the expanded device ascertainment service is entering the device type control point as a search target in a search request sent to said distributed stations in the network.

11. Home network station according to claim 10, wherein the home network station comprises registration means which can be accessed by the other control point devices in the home network in order to register for notifying about changed user profile information.

12. Home network station according to claim 10, wherein the user profile information relates to a user profile about preferably desired musical orientation, preferably desired TV or radio channels or programmes or a list of selected Internet pages.

13. Home network station according to claim 11, wherein the user profile differs according to time of day, day of the week, month or season, or a special time such as a holiday or business trip.

14. Home network station according to claim 10, wherein the control point device which has been notified about user profile information transfers the changed user profile information to its own user profile.

15. Home network station according to claim 10, wherein the user profile information is linked to currency-level information.

16. Home network station according to claim 15, wherein the changed user profile information is transferred only if it has been found to be more current than the information in the user profile.

17. Home network station according to claim 10, wherein the user profile information is linked to transfer control information, which indicates whether the changed information is to be transferred from the other control point devices in the home network regardless of any currency-level information which is present.

18. Home network station according to claim 10, wherein the home network station is designed on the basis of the UPnP standard, corresponding to Universal Plug and Play.

19. Home network station as control point device for acting as an answering control point device in the method according to claim 1, with one or more user profile information items, wherein, the home network station has an expanded device ascertainment service which can be used to find the other control point devices in the home network, and in that one or more additionally implemented user profile services are provided which are used to notify the other control point devices in the home network about changed user profile information, wherein a device type control point is assigned to the control point device and the expanded device ascertainment service is adapted to make use of a discovery protocol in which control point devices are searchable based on the assigned device type control point, wherein for searching a control point device the expanded device ascertainment service is answering to a search request in which the device type control point is entered as the search target in a search request in a response message.

* * * * *